(12) United States Patent
Chen et al.

(10) Patent No.: US 9,113,463 B2
(45) Date of Patent: Aug. 18, 2015

(54) RESOURCE MANAGEMENT FOR ENHANCED PDCCH

(71) Applicant: QUALCOMM Incorporated, San Diego, CA (US)

(72) Inventors: Wanshi Chen, San Diego, CA (US); Peter Gaal, San Diego, CA (US); Tao Luo, San Diego, CA (US); Jelena Damnjanovic, Del Mar, CA (US); Stefan Geirhofer, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 167 days.

(21) Appl. No.: 13/666,582

(22) Filed: Nov. 1, 2012

(65) Prior Publication Data

US 2013/0114419 A1 May 9, 2013

Related U.S. Application Data

(60) Provisional application No. 61/556,106, filed on Nov. 4, 2011.

(51) Int. Cl.
H04W 72/04 (2009.01)
H04L 5/00 (2006.01)

(52) U.S. Cl.
CPC ............ *H04W 72/044* (2013.01); *H04L 5/0053* (2013.01)

(58) Field of Classification Search
CPC ........................... H04W 72/044; H04L 5/0053
See application file for complete search history.

(56) References Cited

U.S. PATENT DOCUMENTS

| 8,005,039 B2 | 8/2011 | Kamuf et al. |
| 2011/0044391 A1 | 2/2011 | Ji et al. |
| 2011/0170496 A1 | 7/2011 | Fong et al. |
| 2011/0249633 A1* | 10/2011 | Hong et al. .................. 370/329 |

(Continued)

FOREIGN PATENT DOCUMENTS

| KR | 20110084976 A | 7/2011 |
| WO | 2010053984 A2 | 5/2010 |
| WO | WO-2010076300 A1 | 7/2010 |
| WO | 2011085195 A1 | 7/2011 |

OTHER PUBLICATIONS

International Search Report and Written Opinion—PCT/US2012/063166—ISA/EPO—Jan. 30, 2013.

(Continued)

*Primary Examiner* — Clemence Han
(74) *Attorney, Agent, or Firm* — Patterson & Sheridan, L.L.P.

(57) ABSTRACT

Certain aspects of the present disclosure provide techniques for managing resources utilized for enhanced physical downlink control channel (PDCCH) transmissions. According to certain aspects, a method is provided for wireless communications which may be performed, for example, by a user equipment (UE). The method generally includes receiving signaling indicating a set of time and frequency resources in one or more subframes allocated for an enhanced physical downlink control channel (PDCCH), receiving a downlink transmission in a subframe, making a determination to monitor for the enhanced PDCCH in the subframe based on the signaling, and decoding the enhanced PDCCH transmitted using the set of time and frequency resources in the subframe, in response to the determination.

76 Claims, 11 Drawing Sheets

(56) References Cited

U.S. PATENT DOCUMENTS

| | | |
|---|---|---|
| 2012/0106465 A1 | 5/2012 | Haghighat et al. |
| 2012/0207126 A1 | 8/2012 | Qu et al. |
| 2014/0119317 A1* | 5/2014 | Kim et al. .................... 370/329 |
| 2014/0153539 A1* | 6/2014 | Seo et al. .................... 370/330 |
| 2014/0192753 A1* | 7/2014 | Jang et al. ................... 370/329 |

OTHER PUBLICATIONS

LG-Ericsson, Consideration on E-PDCCH multiplexing and signaling [online], 3GPP TSG-RAN WG1#66b R1-113372, <URL: http://www.3gpp.org/ftp/tsg_ran/WG1_RL1/TSGR1_66b/Docs/R1-113372.zip>, Oct. 4, 2011, pp. 1-3.

* cited by examiner

RESOURCE MANAGEMENT FOR ENHANCED PDCCH

CLAIM OF PRIORITY UNDER 35 U.S.C. §119

This application claims benefit of U.S. Provisional Patent Application Ser. No. 61/556,106, filed Nov. 4, 2011, which is herein incorporated by reference in its entirety.

BACKGROUND

1. Field

Aspects of the present disclosure relate generally to wireless communication systems, and more particularly, to resource management for physical downlink control channels.

2. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

SUMMARY

Certain aspects of the present disclosure provide a method for wireless communications by a user equipment (UE). The method generally includes receiving signaling indicating a set of time and frequency resources in one or more subframes allocated for an enhanced physical downlink control channel (PDCCH), receiving a downlink transmission in a subframe, making a determination to monitor for the enhanced PDCCH in the subframe based on the signaling, and decoding the enhanced PDCCH transmitted using the set of time and frequency resources in the subframe, in response to the determination.

Certain aspects of the present disclosure provide an apparatus for wireless communications by a user equipment (UE). The apparatus generally includes means for receiving signaling indicating a set of time and frequency resources in one or more subframes allocated for an enhanced physical downlink control channel (PDCCH), means for receiving a downlink transmission in a subframe, means for making a determination to monitor for the enhanced PDCCH in the subframe based on the signaling, and means for decoding the enhanced PDCCH transmitted using the set of time and frequency resources in the subframe, in response to the determination.

Certain aspects of the present disclosure provide an apparatus for wireless communications by a user equipment (UE). The apparatus generally includes at least one processor configured to receive signaling indicating a set of time and frequency resources in one or more subframes allocated for an enhanced physical downlink control channel (PDCCH), receive a downlink transmission in a subframe, make a determination to monitor for the enhanced PDCCH in the subframe based on the signaling, and decode the enhanced PDCCH transmitted using the set of time and frequency resources in the subframe, in response to the determination; and a memory coupled with the at least one processor.

Certain aspects of the present disclosure provide a computer program product for wireless communications by a user equipment (UE) comprising a computer readable medium having instructions stored thereon. The instructions are generally executable by one or more processors for receiving signaling indicating a set of time and frequency resources in one or more subframes allocated for an enhanced physical downlink control channel (PDCCH), receiving a downlink transmission in a subframe, making a determination to monitor for the enhanced PDCCH in the subframe based on the signaling, and decoding the enhanced PDCCH transmitted using the set of time and frequency resources in the subframe, in response to the determination.

Certain aspects of the present disclosure provide a method for wireless communications by a base station. The method generally includes transmitting, to a user equipment (UE), signaling indicating a set of time and frequency resources in one or more subframes allocated for an enhanced physical downlink control channel (PDCCH), making a determination to transmit the enhanced PDCCH in a subframe, and transmitting the enhanced PDCCH using the set of time and frequency resources in the subframe, in response to the determination.

Certain aspects of the present disclosure provide an apparatus for wireless communications by a base station. The apparatus generally includes means for transmitting, to a user equipment (UE), signaling indicating a set of time and frequency resources in one or more subframes allocated for an enhanced physical downlink control channel (PDCCH), means for making a determination to transmit the enhanced PDCCH in a subframe, and means for transmitting the enhanced PDCCH using the set of time and frequency resources in the subframe, in response to the determination.

Certain aspects of the present disclosure provide an apparatus for wireless communications by a base station. The apparatus generally includes at least one processor configured to transmit, to a user equipment (UE), signaling indicating a set of time and frequency resources in one or more subframes allocated for an enhanced physical downlink control channel (PDCCH), make a determination to transmit the enhanced PDCCH in a subframe, and transmit the enhanced PDCCH using the set of time and frequency resources in the subframe, in response to the determination.

Certain aspects of the present disclosure provide a computer program product for wireless communications by a base station comprising a computer readable medium having instructions stored thereon. The instructions are generally executable by one or more processors for transmitting, to a user equipment (UE), signaling indicating a set of time and frequency resources in one or more subframes allocated for an enhanced physical downlink control channel (PDCCH), making a determination to transmit the enhanced PDCCH in a subframe, and transmitting the enhanced PDCCH using the set of time and frequency resources in the subframe, in response to the determination.

Various aspects and features of the disclosure are described in further detail below.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
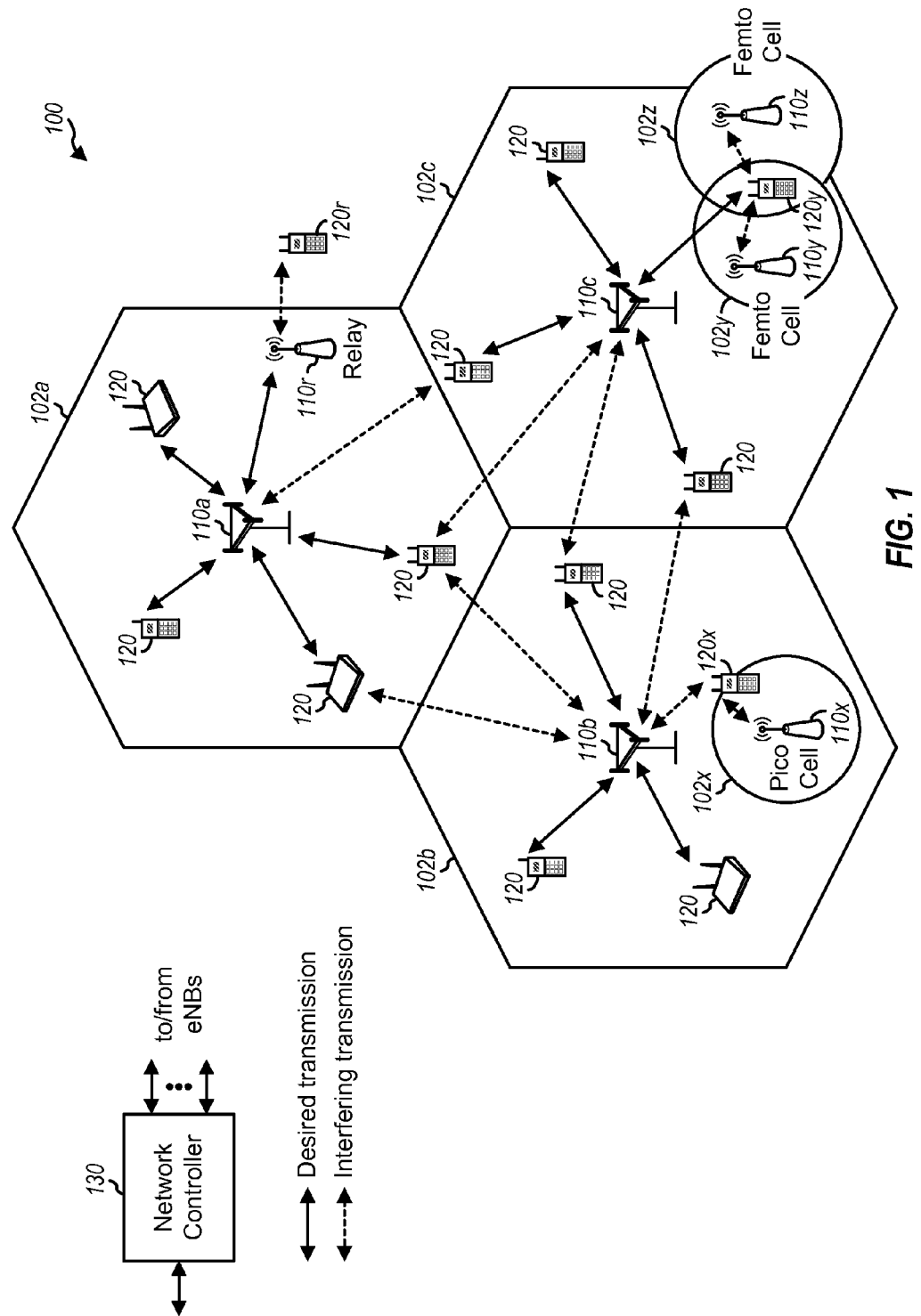
FIG. 1 is a block diagram conceptually illustrating an example of a telecommunications system.

FIG. 1 shows a wireless communication network 100, which may be an LTE network. The wireless network 100 may include a number of evolved Node Bs (eNodeBs) 110 and other network entities. An eNodeB may be a station that communicates with the UEs and may also be referred to as a base station, an access point, etc. A Node B is another example of a station that communicates with the UEs.

Each eNodeB 110 may provide communication coverage for a particular geographic area. In 3GPP, the term "cell" can refer to a coverage area of an eNodeB and/or an eNodeB subsystem serving this coverage area, depending on the context in which the term is used.

An eNodeB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNodeB for a macro cell may be referred to as a macro eNodeB. An eNodeB for a pico cell may be referred to as a pico eNodeB. An eNodeB for a femto cell may be referred to as a femto eNodeB or a home eNodeB. In the example shown in FIG. 1, the eNodeBs 110a, 110b and 110c may be macro eNodeBs for the macro cells 102a, 102b and 102c, respectively. The eNodeB 110x may be a pico eNodeB for a pico cell 102x. The eNodeBs 110y and 110z may be femto eNodeBs for the femto cells 102y and 102z, respectively. An eNodeB may support one or multiple (e.g., three) cells.

The wireless network 100 may also include relay stations. A relay station is a station that receives a transmission of data and/or other information from an upstream station (e.g., an eNodeB or a UE) and sends a transmission of the data and/or other information to a downstream station (e.g., a UE or an eNodeB). A relay station may also be a UE that relays transmissions for other UEs. In the example shown in FIG. 1, a relay station 110r may communicate with the eNodeB 110a and a UE 120r in order to facilitate communication between the eNodeB 110a and the UE 120r. A relay station may also be referred to as a relay eNodeB, a relay, etc.

The wireless network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 20 Watts) whereas pico eNodeBs, femto eNodeBs and relays may have a lower transmit 7).

The wireless network 100 may support synchronous or asynchronous operation. For synchronous operation, the eNodeBs may have similar frame timing, and transmissions from different eNodeBs may be approximately aligned in time. For asynchronous operation, the eNodeBs may have different frame timing, and transmissions from different eNodeBs may not be aligned in time. The techniques described herein may be used for both synchronous and asynchronous operation.

A network controller 130 may couple to a set of eNodeBs and provide coordination and control for these eNodeBs. The network controller 130 may communicate with the eNodeBs 110 via a backhaul. The eNodeBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, etc. A UE may be able to communicate with macro eNodeBs, pico eNodeBs, femto eNodeBs, relays, etc. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

Figure 2:
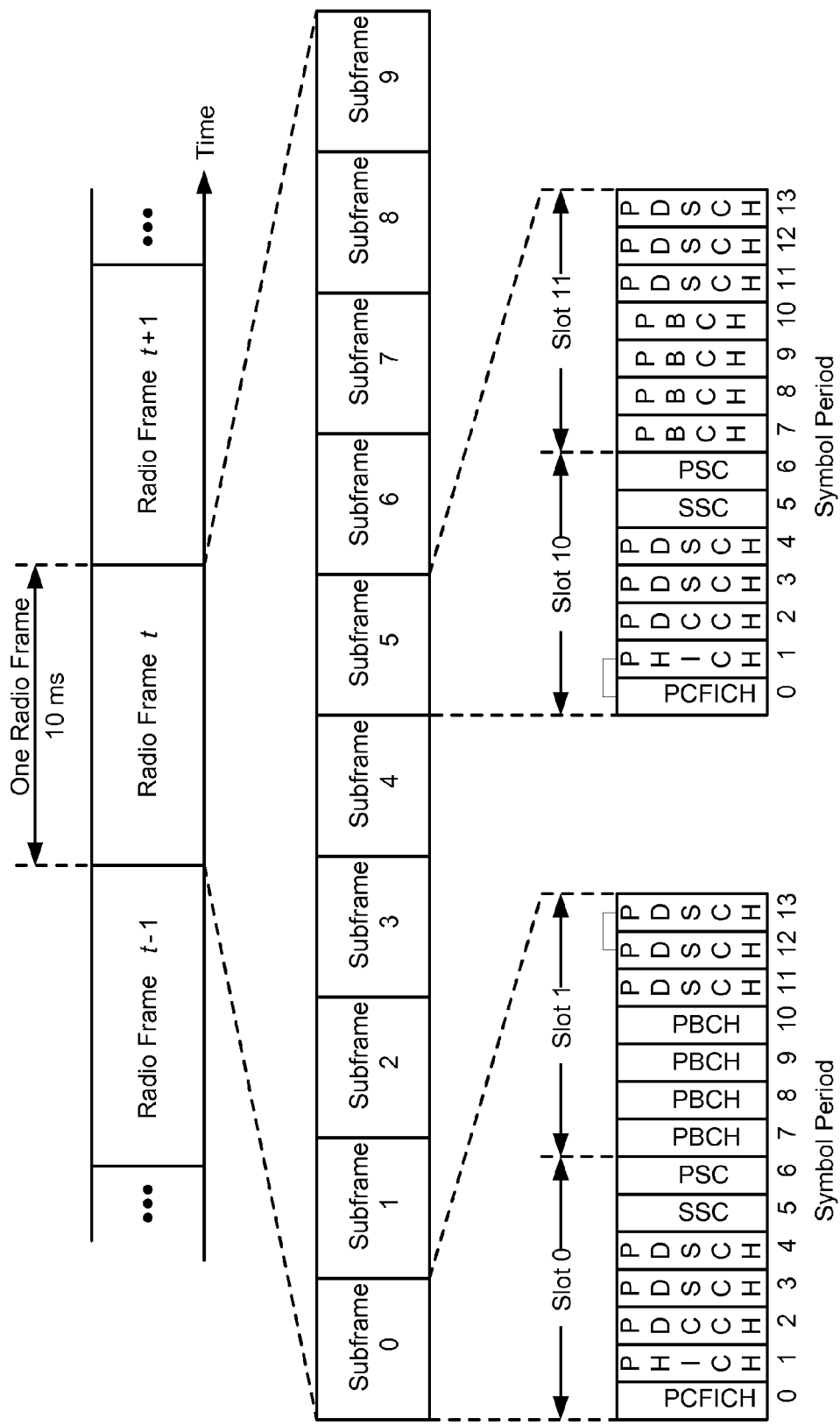
FIG. 2 is a block diagram conceptually illustrating an example of a down link frame structure in a telecommunications system.

FIG. 2 shows a down link frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 14 symbol periods for an extended cyclic prefix. The 2 L symbol periods in each subframe may be assigned indices of 0 through 2 L−1. The available time frequency resources may be partitioned into resource blocks. Each resource block may cover N subcarriers (e.g., 12 subcarriers) in one slot.

In LTE, an eNodeB may send a primary synchronization signal (PSS) and a secondary synchronization signal (SSS) for each cell in the eNodeB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in only a portion of the first symbol period of each subframe, although depicted in the entire first symbol period in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each subframe (M=3 in FIG. 2). The PHICH may carry information to support hybrid automatic retransmission (HARQ). The PDCCH may carry information on uplink and downlink resource allocation for UEs and power control information for uplink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The eNodeB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNodeB may send the PSS, SSS and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to specific UEs in specific portions of the system bandwidth. The eNodeB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 3:
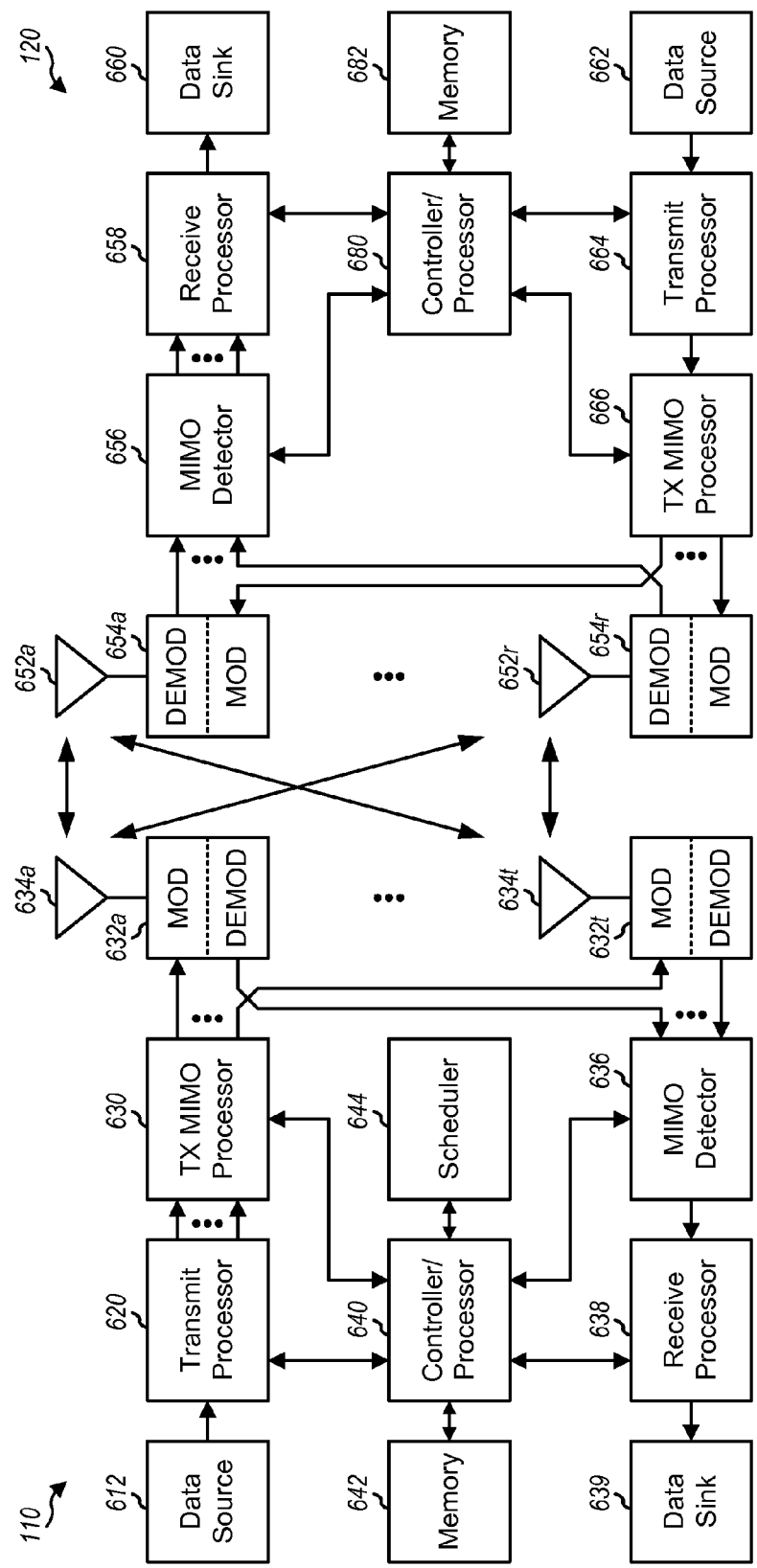
FIG. 3 is a block diagram conceptually illustrating a design of a base station/eNodeB and a UE configured according to one aspect of the present disclosure.

FIG. 3 shows a block diagram of a design of a base station/eNodeB 110 and a UE 120, which may be one of the base stations/eNodeBs and one of the UEs in FIG. 1. For a restricted association scenario, the base station 110 may be the macro eNodeB 110c in FIG. 1, and the UE 120 may be the UE 120y. The base station 110 may also be a base station of some other type. The base station 110 may be equipped with antennas 634a through 634t, and the UE 120 may be equipped with antennas 652a through 652r.

At the base station 110, a transmit processor 620 may receive data from a data source 612 and control information from a controller/processor 640. The control information may be for the PBCH, PCFICH, PHICH, PDCCH, etc. The data may be for the PDSCH, etc. The processor 620 may process (e.g., encode and symbol map) the data and control information to obtain data symbols and control symbols, respectively. The processor 620 may also generate reference symbols, e.g., for the PSS, SSS, and cell-specific reference signal. A transmit (TX) multiple-input multiple-output (MIMO) processor 630 may perform spatial processing (e.g., precoding) on the data symbols, the control symbols, and/or the reference symbols, if applicable, and may provide output symbol streams to the modulators (MODs) 632a through 632t. Each modulator 632 may process a respective output symbol stream (e.g., for OFDM, etc.) to obtain an output sample stream. Each modulator 632 may further process (e.g., convert to analog, amplify, filter, and upconvert) the output sample stream to obtain a downlink signal. Downlink signals from modulators 632a through 632t may be transmitted via the antennas 634a through 634t, respectively.

At the UE 120, the antennas 652a through 652r may receive the downlink signals from the base station 110 and may provide received signals to the demodulators (DEMODs) 654a through 654r, respectively. Each demodulator 654 may condition (e.g., filter, amplify, downconvert, and digitize) a respective received signal to obtain input samples. Each demodulator 654 may further process the input samples (e.g., for OFDM, etc.) to obtain received symbols. A MIMO detector 656 may obtain received symbols from all the demodulators 654a through 654r, perform MIMO detection on the received symbols if applicable, and provide detected symbols. A receive processor 658 may process (e.g., demodulate, deinterleave, and decode) the detected symbols, provide decoded data for the UE 120 to a data sink 660, and provide decoded control information to a controller/processor 680.

On the uplink, at the UE 120, a transmit processor 664 may receive and process data (e.g., for the PUSCH) from a data source 662 and control information (e.g., for the PUCCH) from the controller/processor 680. The transmit processor 664 may also generate reference symbols for a reference signal. The symbols from the transmit processor 664 may be precoded by a TX MIMO processor 666 if applicable, further processed by the demodulators 654a through 654r (e.g., for SC-FDM, etc.), and transmitted to the base station 110. At the base station 110, the uplink signals from the UE 120 may be received by the antennas 634, processed by the modulators 632, detected by a MIMO detector 636 if applicable, and further processed by a receive processor 638 to obtain decoded data and control information sent by the UE 120. The receive processor 638 may provide the decoded data to a data sink 639 and the decoded control information to the controller/processor 640.

The controllers/processors 640 and 680 may direct the operation at the base station 110 and the UE 120, respectively. The processor 640 and/or other processors and modules at the base station 110 may perform or direct the execution of various processes for the techniques described herein. The processor 680 and/or other processors and modules at the UE 120 may also perform or direct the execution of the functional blocks illustrated in FIGS. 4A, 4B, 5 and 6, and/or other processes for the techniques described herein. The memories 642 and 682 may store data and program codes for the base station 110 and the UE 120, respectively. A scheduler 644 may schedule UEs for data transmission on the downlink and/or uplink.

In one configuration, the UE 120 for wireless communication includes means for detecting interference from an interfering base station during a connection mode of the UE, means for selecting a yielded resource of the interfering base station, means for obtaining an error rate of a physical downlink control channel on the yielded resource, and means, executable in response to the error rate exceeding a predetermined level, for declaring a radio link failure. In one aspect, the aforementioned means may be the processor(s), the controller/processor 680, the memory 682, the receive processor 658, the MIMO detector 656, the demodulators 654a, and the antennas 652a configured to perform the functions recited by the aforementioned means. In another aspect, the aforementioned means may be a module or any apparatus configured to perform the functions recited by the aforementioned means.

Carrier Aggregation

LTE-Advanced UEs use spectrum up to 20 Mhz bandwidths allocated in a carrier aggregation of up to a total of 100 Mhz (5 component carriers) used for transmission in each direction. Generally, less traffic is transmitted on the uplink than the downlink, so the uplink spectrum allocation may be smaller than the downlink allocation. For example, if 20 Mhz is assigned to the uplink, the downlink may be assigned 100 Mhz. These asymmetric FDD assignments will conserve spectrum and are a good fit for the typically asymmetric bandwidth utilization by broadband subscribers.

Carrier Aggregation Types

Figure 4A:
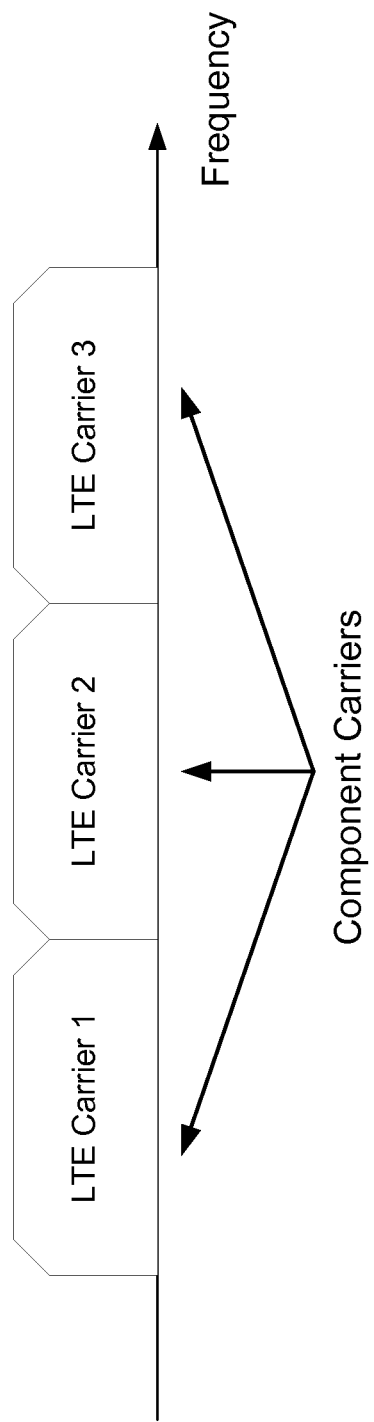
FIG. 4A discloses a continuous carrier aggregation type.
Figure 4B:
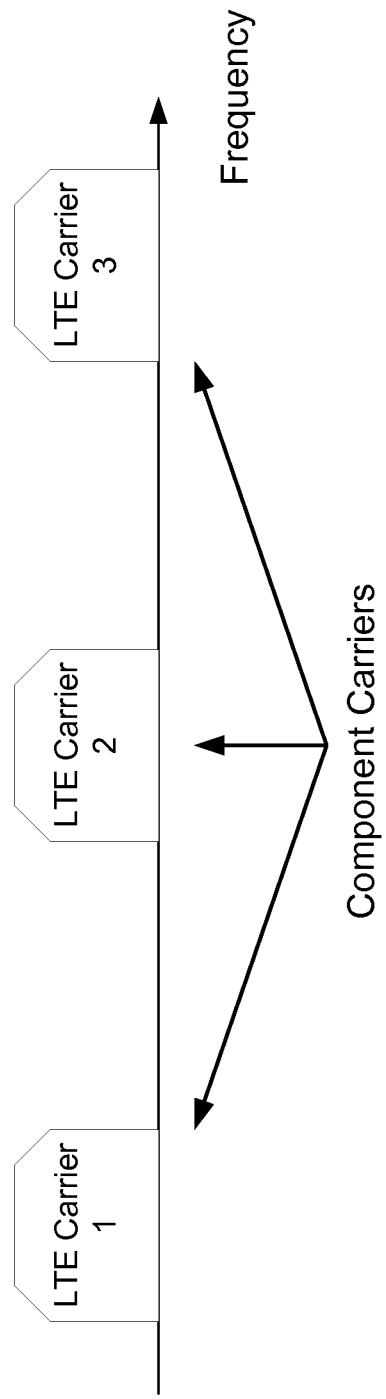
FIG. 4B discloses a non-continuous carrier aggregation type.

For the LTE-Advanced mobile systems, two types of carrier aggregation (CA) methods have been proposed, continuous CA and non-continuous CA. They are illustrated in FIGS. 4A and 4B. Non-continuous CA occurs when multiple available component carriers are separated along the frequency band (FIG. 4B). On the other hand, continuous CA occurs when multiple available component carriers are adjacent to each other (FIG. 4A). Both non-continuous and continuous CA aggregate multiple LTE/component carriers to serve a single unit of LTE Advanced UE.

Multiple RF receiving units and multiple FFTs may be deployed with non-continuous CA in LTE-Advanced UE since the carriers are separated along the frequency band. Because non-continuous CA supports data transmissions over multiple separated carriers across a large frequency range, propagation path loss, Doppler shift and other radio channel characteristics may vary a lot at different frequency bands.

Thus, to support broadband data transmission under the non-continuous CA approach, methods may be used to adaptively adjust coding, modulation and transmission power for different component carriers. For example, in an LTE-Advanced system where the enhanced NodeB (eNodeB) has fixed transmitting power on each component carrier, the effective coverage or supportable modulation and coding of each component carrier may be different.

Data Aggregation Schemes

Figure 5:
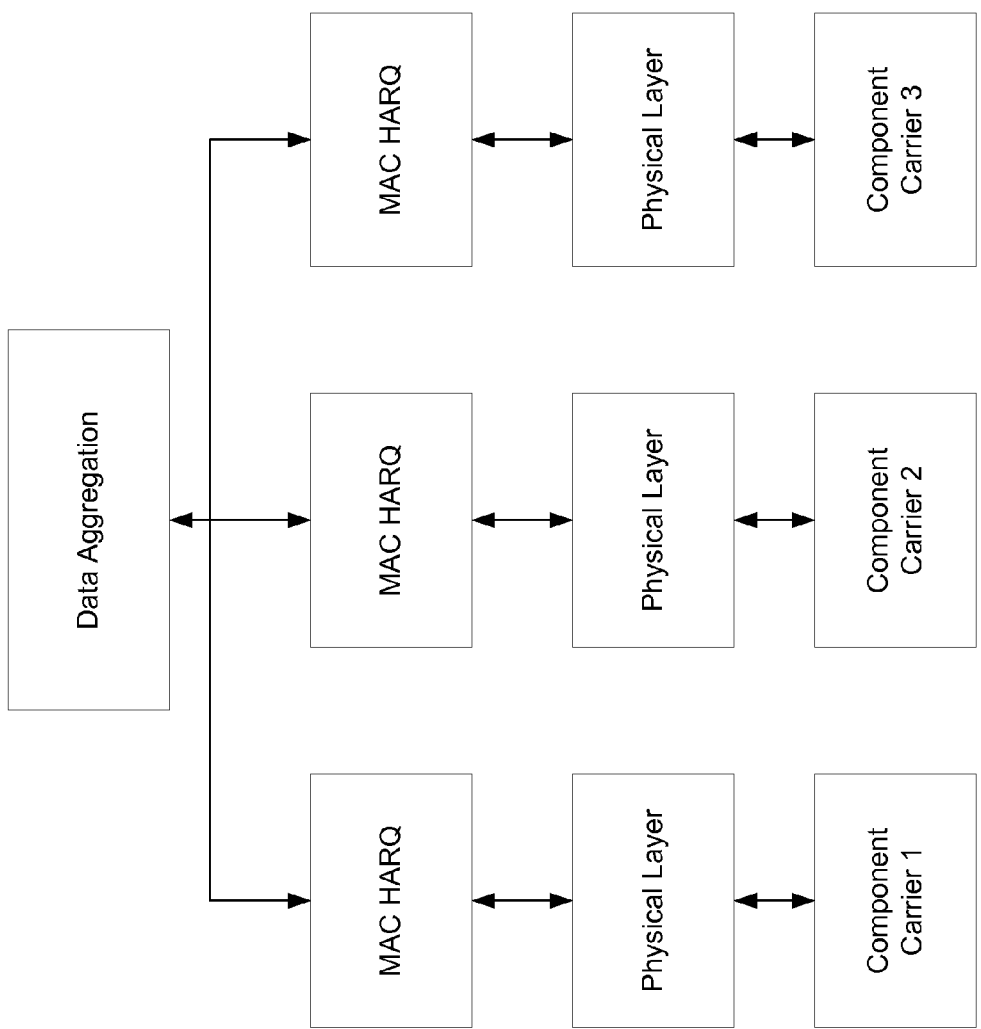
FIG. 5 discloses MAC layer data aggregation.

FIG. 5 illustrates aggregating transmission blocks (TBs) from different component carriers at the medium access control (MAC) layer (FIG. 5) for an IMT-Advanced system. With MAC layer data aggregation, each component carrier has its own independent hybrid automatic repeat request (HARQ)

entity in the MAC layer and its own transmission configuration parameters (e.g., transmitting power, modulation and coding schemes, and multiple antenna configuration) in the physical layer. Similarly, in the physical layer, one HARQ entity is provided for each component carrier.

Control Signaling

In general, there are three different approaches for deploying control channel signaling for multiple component carriers. The first involves a minor modification of the control structure in LTE systems where each component carrier is given its own coded control channel.

The second method involves jointly coding the control channels of different component carriers and deploying the control channels in a dedicated component carrier. The control information for the multiple component carriers will be integrated as the signaling content in this dedicated control channel. As a result, backward compatibility with the control channel structure in LTE systems is maintained, while signaling overhead in the CA is reduced. Multiple control channels for different component carriers are jointly coded and then transmitted over the entire frequency band formed by a third CA method. This approach offers low signaling overhead and high decoding performance in control channels, at the expense of high power consumption at the UE side. However, this method is not compatible with LTE systems.

Handover Control

It is preferable to support transmission continuity during the handover procedure across multiple cells when CA is used for IMT-Advanced UE. However, reserving sufficient system resources (i.e., component carriers with good transmission quality) for the incoming UE with specific CA configurations and quality of service (QoS) requirements may be challenging for the next eNodeB. The reason is that the channel conditions of two (or more) adjacent cells (eNodeBs) may be different for the specific UE. In one approach, the UE measures the performance of only one component carrier in each adjacent cell. This offers similar measurement delay, complexity, and energy consumption as that in LTE systems. An estimate of the performance of the other component carriers in the corresponding cell may be based on the measurement result of the one component carrier. Based on this estimate, the handover decision and transmission configuration may be determined.

According to various embodiments, the UE operating in a multicarrier system (also referred to as carrier aggregation) is configured to aggregate certain functions of multiple carriers, such as control and feedback functions, on the same carrier, which may be referred to as a "primary carrier." The remaining carriers that depend on the primary carrier for support are referred to as associated secondary carriers. For example, the UE may aggregate control functions such as those provided by the optional dedicated channel (DCH), the nonscheduled grants, a physical uplink control channel (PUCCH), and/or a physical downlink control channel (PDCCH). Signaling and payload may be transmitted both on the downlink by the eNode B to the UE, and on the uplink by the UE to the eNode B.

In some embodiments, there may be multiple primary carriers. In addition, secondary carriers may be added or removed without affecting the basic operation of the UE, including physical channel establishment and RLF procedures which are layer 2 procedures, such as in the 3GPP technical specification 36.331 for the LTE RRC protocol.

Figure 6:
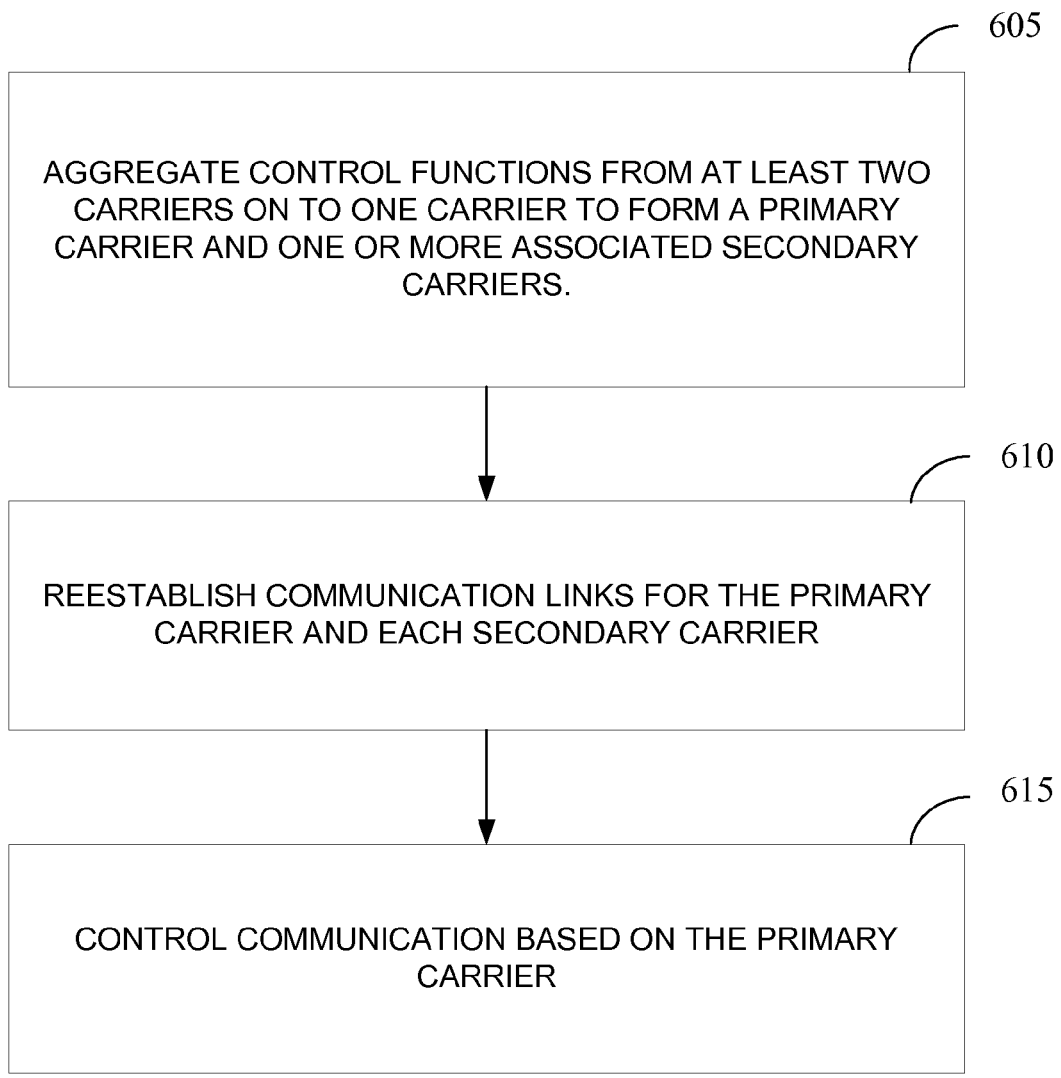
FIG. 6 is a block diagram illustrating a method for controlling radio links in multiple carrier configurations.

FIG. 6 illustrates a method 600 for controlling radio links in a multiple carrier wireless communication system by grouping physical channels according to one example. As shown, the method includes, at block 605, aggregating control functions from at least two carriers onto one carrier to form a primary carrier and one or more associated secondary carriers. Next at block, 610, communication links are established for the primary carrier and each secondary carrier. Then, communication is controlled based on the primary carrier in block 615.

Transmission Structure for E-PDCCH

According to certain aspects, an enhanced Physical Downlink Control Channel (e-PDCCH) is proposed to carry resource assignments and other control information for a user equipment (UE) or a group of UEs while supporting several advanced techniques. Many motivations exist for an e-PDCCH. For example, e-PDCCH may improve carrier aggregation enhancements, help support new carriers, which may not be backwards compatible, reduce control channel capacity limitations of coordinated multipoint (CoMP) transmissions, and enhance DL MIMO. According to aspects of the present disclosure, an e-PDCCH may support increased control channel capacity and frequency-domain Inter Cell Interference Coordination (ICIC). e-PDCCH may achieve improved spatial reuse of control channel resources. As well, the e-PDCCH may support beamforming and/or diversity, operate on new carrier types and in Multimedia-Broadcast Single Frequency Network (MBSFN) subframes, and may coexist on the same carrier as legacy UEs. The e-PDCCH may be scheduled in a frequency-selective manner and may mitigate inter-cell interference.

Figure 7:
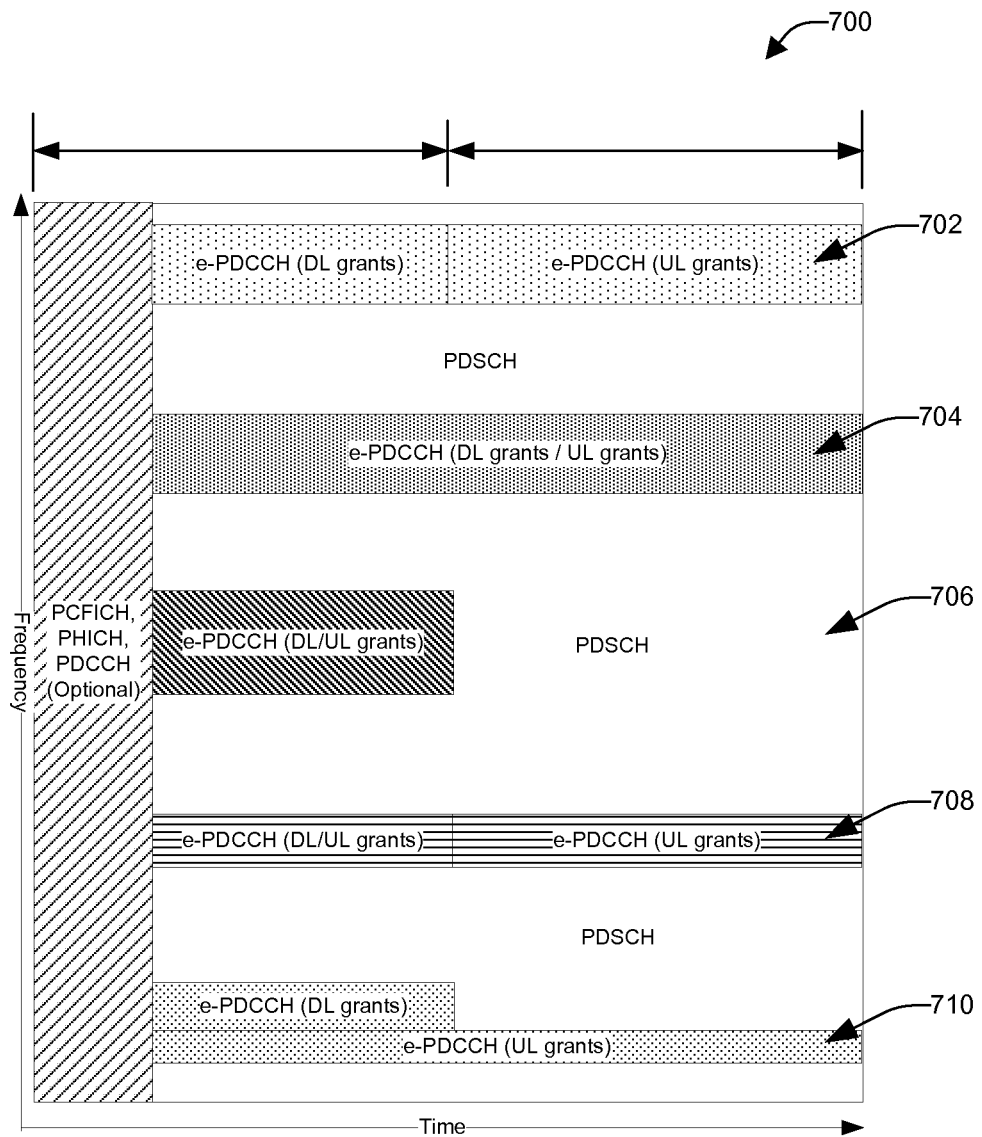
FIG. 7 illustrates examples of a radio structure for a downlink control channel according to certain aspects of the disclosure.

FIG. 7 illustrates possible structures for e-PDCCH 700, according to aspects of the present disclosure. As will be described in more detail below, aspects presented herein provide various schemes for e-PDCCH placement, including: placement similar to R-PDCCH, a pure-FDM scheme, a TDM scheme, placement similar to a R-PDCCH, and a hybrid TDM and FDM scheme. As indicated, unlike "legacy" PDCCH, an e-PDCCH may span resources available for PDSCH.

According to a first alternative, 702, the e-PDCCH may be transmitted similarly to transmission of the R-PDCCH, wherein DL grants may be transmitted in a first slot and UL grants may be transmitted in a second slot. According to aspects, the second slot may be used for downlink data transmission if it is not being used for transmission of grants.

According to a second alternative, 704, the e-PDCCH may be transmitted in a pure FDM scheme, wherein DL grants and UL grants span the resource block. As shown, a set of resources in the frequency domain are allocated for transmission of e-PDCCH across a time domain comprising a first time slot and a second time slot. According to certain aspects, a subset of RBs multiplexed in the frequency domain with PDSCH are allocated for transmitting e-PDCCH including both uplink and downlink grants across the first and second time slots.

According to a third alternative, 706, the e-PDCCH may be transmitted in a first slot according to a TDM scheme, wherein DL and UL grants are transmitted in a first slot. As illustrated, the remaining RBs may be utilized for transmitting the PDSCH data transmissions.

According to a fourth alternative, 708, the e-PDCCH may be transmitted in a manner similar to R-PDCCH, wherein DL and UL grants may be transmitted in a first slot and UL grants may be transmitted in a second slot. According to certain aspects, if a DL grant is transmitted in a first PRB of a given PRB pair, then an UL grant may be transmitted in a second PRB of the PRB pair. Otherwise, an UL grant may be transmitted in either the first or second PRB of the PRB pair. According to a fifth alternative, 710, the e-PDCCH may be transmitted using TDM for DL grants in a first slot and FDM for UL grants spanning a first and second slot.

Resource Management for e-PDCCH

Certain aspects of the present disclosure provide techniques for managing a set of time and frequency resources utilized for enhanced PDCCH (e-PDCCH) transmissions. According to certain aspects, a base station may signal a set of time and frequency resources allocated for e-PDCCH transmissions. Based on this signaling, a UE may make a determination whether or not to monitor for the enhanced PDCCH in a given subframe.

According to certain aspects, a base station may utilize e-PDCCH to transmit resource assignments and other control information for a UE or a group of UEs. According to certain aspects, a UE may be configured via Radio Resource Control (RRC) to utilize a pool of resources for e-PDCCH. Dedicated signaling for e-PDCCH may advantageously exploit frequency-selective e-PDCCH placement, FDM heterogeneous networks, and other features.

According to certain aspects, broadcast signaling may be utilized for resource allocation to a group of UEs based on whether the intended usage for e-PDCCH is to complement or to replace legacy PDCCH. From the perspective of a cell, there may be legacy UEs connected to the cell, except in "green-field" deployments. From the perspective of an individual UE, it may be possible to replace UE-specific search space, depending on the design of the search space, but is unlikely to replace a common search space.

According to certain aspects, an enhanced physical control format indicator channel (e-PCFICH) may be utilized for indicating a number of symbols used for transmission of enhanced control channel information in each subframe. An e-PCFICH may advantageously provide resource flexibility and reduce resource waste in scenarios where e-PDCCH may require fewer symbols. As such, it is noted that e-PCFICH may be useful depending on whether the reserved but unused e-PDCCH resources can be readily reused for PDSCH.

According to certain aspects, for a pure FDM based e-PDCCH, as described above, e-PCFICH may be omitted. This may be possible because any unused e-PDCCH resources may be readily re-used by PDSCH using type 0, type 1 and localized type 2 resource assignments, and partially by distributed type 2 resource assignments.

According to certain aspects, for TDM based e-PDCCH (e.g., similar to the separated FDM approach or pure TDM approaches described above, wherein all e-PDCCH is transmitted in the first time slot), the unused e-PDCCH resource may be similarly re-used by PDSCH. For example, the second PRBs corresponding to the first PRBs of the same PRB pairs used for e-PDCCH can be used for PDSCH of the same UE if PDSCH is assigned with the second PRBs. It is noted that PDSCH may use the same (or default) port as e-PDCCH if there is no port index for PDSCH; or explicitly indicated ports.

According to certain aspects, resources allocated for transmitting e-PDCCH may be based on resource allocation types defined for PDSCH. In one aspect, a resource allocation type 0 may be utilized that uses a bitmap to indicate resource block groups (RBGs) that are allocated for the e-PDCCH. A resource allocation type 1 may be utilized wherein individual PRBs can be addressed for allocation within a subset of PRBs available. According to certain aspects, both localized and distributed resource allocation may be allowed for e-PDCCH.

According to certain aspects, a TDM scheme may be utilized for both UL and DL grants or for DL grants only. Where the TDM scheme utilizes distribution resource allocation, the TDM scheme may utilize only the first slot of the subframe.

According to certain aspects, a FDM scheme may be utilized for both UL and DL grants for UL grants. According to certain aspects, for any scheme (e.g., TDM, FDM), a bitmap having a 1 RB resolution may be utilized to provide a more flexible technique for resource allocation. In one aspect, the bitmap may have up to 100 bits for RRC signaling.

According to certain aspects, resource allocation may involve one set of resources for both DL and UL grants. Alternatively, resource allocation may be involve two separate sets of resources for DL and UL grants, respectively, depending on the e-PDCCH structure and interleaving type. For example, a transmission may utilize a hybrid scheme having TDM DL grants and FDM UL grants utilizing two separate sets for resource element group (REG) based e-PDCCH interleaving. In another example, REG-based e-PDCCH interleaving may utilize two separate sets of allocated resources.

According to certain aspects, the resource allocation can be one set for all aggregation levels; alternatively, the resource allocation can be separately configured for each aggregation level. According to certain aspects, the resource allocation can be one set for common search space and UE-specific search space; alternatively, the resource allocation can be separately configured for common and UE-specific search spaces.

According to certain aspects, the resource allocation for UE-specific search space may be UE-specific. Further, different UEs may have different resource allocation types (e.g. type 0, type 1, etc.). As such, according to certain aspects, in a cell, two or more resource allocation types for different UEs may exist in a same subframe, as may be configured and handled by a base station (e.g., an eNB).

According to certain aspects, PRB bundling may be utilized, wherein the same precoding is applied to two or more PRBs (referred to as precoding RB groups or "PRG") may be supported by e-PDCCH. For example, for groupings of less than or equal to 10 resource blocks (RBs), a PRG may have a size of one physical RB. For groupings from 11 to 26 RBs, a PRG may have a size of 2 PRBs; for groupings of 27-63 RBs, a PRG size may be 3 PRBs; and for groupings of 64-110 RBs, a PRG size may be 2 PRBs. According to certain aspects, the allocation of resources for e-PDCCH may take PRG factors (e.g., PRG size) into account.

Regarding to the time domain for e-PDCCH, depending on a particular design, all subframes may include e-PDCCH or e-PDCCH may be selectively included in each subframe. In some heterogeneous networks (sometimes referred to as "HetNet"), a subset of subframes with e-PDCCH may be aligned with a subset of non-Almost Blank Sub-frames ("ABS") for cell range expansion (CRE) UEs in pico cells.

However, according to certain aspects, once e-PDCCH is configured for the cell, the e-PDCCH may be applicable to all subframes. Further, the granularity of the control region of each subframe may be such that using legacy PDCCH is more overhead efficient compared with e-PDCCH. For example, if a control region of a subframe is 3 symbols long (e.g., extended PHICH), there is room for legacy PDCCH. In another example, under a FDM scheme such as shown at 706 of FIG. 7, e-PDCCH may be necessary even if 3 control symbols are configured in the legacy PDCCH.

Various factors may affect the efficiency of PDSCH scheduled by e-PDCCH, when compared to PDSCH scheduled by PDCCH. Such efficiency may be affected, for example, by a variety of factors, including but not limited to, a starting symbol index for PDSCH that may be semi-static, and performance of using a second timeslot (as seen in TDM e-PDCCH 706 above) for PDSCH. In some cases, link adaption (due to transport block size look-up) of PDSCH with a significant portion of resources using the second timeslot may be compromised only if the same transport block size lookup design is used. According to certain aspects, the absence of e-PDCCH may result in balancing a reduction in the number of blind decodes that a UE may have to perform against the impact to scheduling flexibility. Further, the absence of e-PDCCH may help save battery power, particularly for low cost devices.

According to certain aspects, subframe-dependent e-PDCCH may be utilized using a bitmap pattern that indicates which subframes contain e-PDCCH and for which UEs. Similar bitmap pattern techniques may be utilized in ABS (e.g., 40-bit bitmap for FDD). According to certain aspects, the enabling of e-PDCCH may have further impact at the search space level, for example, by only allowing common search space for e-PDCCH in certain subframes, but UE-specific search space in some or all subframes. According to certain aspects, one configuration may be utilized that is dedicated to a common search space, or two separate configurations may be utilized, one configuration for a common search space and another for a UE-specific search space. Similarly, for legacy PDCCH, a UE may continue to monitor only a subset of subframes and may be configured to potentially complement those subframes configured for e-PDCCH.

According to certain aspects, a subframe-dependent configuration may be UE-specific. For example, a configuration may indicate that no e-PDCCH is available for a particular UE, but may contain e-PDCCH for other UEs. In another aspect, a subframe-dependent configuration may be cell-specific as well, for example, by configuring that no e-PDCCH is available for all UEs.

Figure 8:
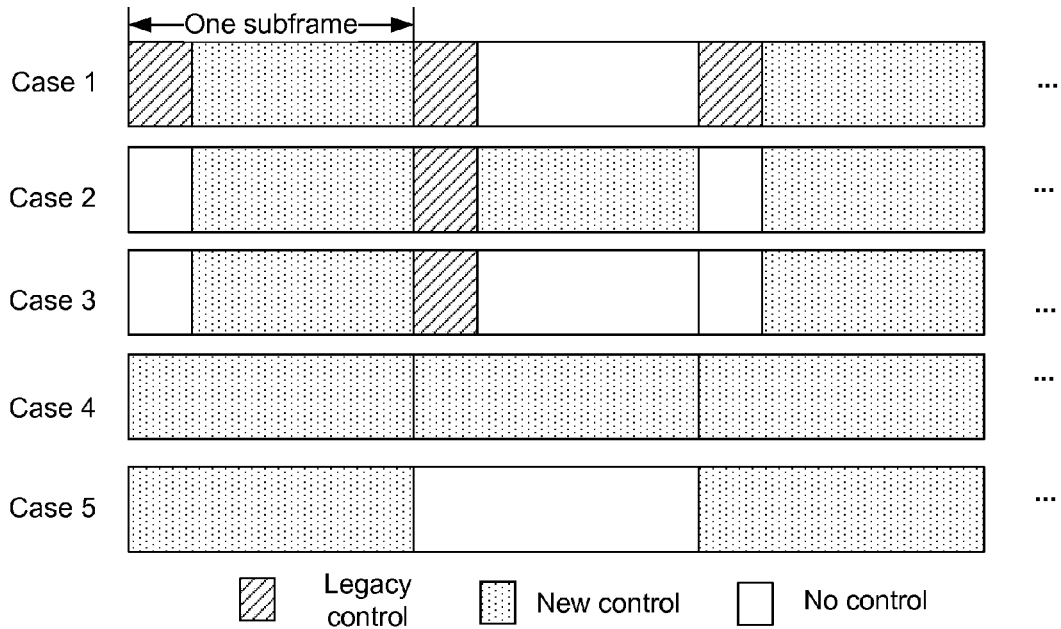
FIG. 8 illustrates examples of subframe configuration for a downlink control channel according to certain aspects of the disclosure.

FIG. 8 illustrates several examples of subframe-dependent configurations for the downlink control channels according to certain aspects of the disclosure. Examples identified as "Case 1", "Case 2", and "Case 3" provide examples of subframe-dependent configurations utilized with legacy carriers having legacy PDCCH. Examples identified as "Case 4" and "case 5" provide examples of subframe dependent control channels applicable to new carrier types that may not be backwards-compatible with legacy carriers or that may not have to carry a legacy control region.

According to certain aspects, Case 1 illustrates a subframe-dependent e-PDCCH configuration wherein legacy PDCCH is transmitted on all subframes and e-PDCCH is transmitted only in selective subframes (e.g., e-PDCCH is shown as transmitted only in the outer two subframes). Case 2 illustrates a subframe-dependent PDCCH configuration wherein e-PDCCH is transmitted in all subframes but legacy PDCCH is transmitted only in a subset of the subframes (e.g., legacy PDCCH is shown as transmitted only in the middle subframe). Case 3 illustrates a subframe-dependent PDCCH and e-PDCCH configuration (note that the non-subframe dependent case is not shown) wherein legacy PDDCH and e-PDCCH are intermixed in all subframes (e.g., with e-PDCCH is shown as transmitted only in the outer two subframes and legacy PDCCH shown as transmitted only in the middle subframe).

According to certain aspects, Case 4 illustrates a non-subframe dependent e-PDCCH configuration wherein all subframes transmit e-PDCCH and may not transmit legacy PDCCH. Case 5 illustrates a subframe-dependent e-PDCCH configuration wherein an e-PDCCH may not always be present in a subframe. This approach considers the local cost for UEs to perform many blind decodes and to monitor all subframes at all times for control channels. Accordingly, this approach advantageously provides better power consumption and improves battery life of UEs. It is noted that the above subframe-dependent e-PDCCH configurations may be indicated to the UE via RRC configuration and signaling.

According to certain aspects of the present disclosure, a starting and ending symbol within a subframe for e-PDCCH may be configured using a variety of approaches and configurations. According to certain aspects, for unicast e-PDCCH which is addressed to a specific UE, the starting symbol of e-PDCCH for a specific UE may be RRC configured. In one aspect, the starting symbol may have an index of 0, 1, 2, 3, or 4. It is noted that symbol index 0 is configured to cover a new carrier type. It is further noted that symbol index 4 is configured to cover a small bandwidth scenario, which may be particularly relevant for low cost UEs.

According to certain aspects, a starting symbol for broadcast e-PDCCH, which is addressed to all UEs, may be pre-determined (i.e. hard-coded) or determined by configuration. According to certain aspects, the broadcast e-PDCCH configuration may be separate from the configuration for the unicast e-PDCCH. In one implementation, the starting symbol index for broadcast e-PDCCH may be hardcoded to start from the 4th symbol of a subframe or time region. In one aspect, the starting symbol index for broadcast e-PDCCH may be configured at the UE via dedicated signaling such that a base station may ensure that the same starting symbol index is configured for all UEs. It is contemplated that the starting symbol index may be broadcasted via broadcast channel, such as Physical Broadcast Channel (PBCH), which would utilize additional bit(s) in PBCH. However, it is contemplated that a UE may not be able to decode PBCH in HetNets. It is noted that starting symbol configurations for the unicast e-PDCCH may be optimized for an individual UE while starting symbol configurations for broadcast (or multicast) e-PDCCH may be more conservative to accommodate timing delays and other consensus issues across a variety of UEs.

According to certain aspects, the configuration of the starting symbol may be subframe-dependent. For example, a starting symbol index for non-MBSFN subframes may be configured to have an index of 3, while MBSFN subframes may have an index of 2. In another example, ABS and non-ABS subframes may be configured to have different starting symbols for e-PDCCH due to different expectations of the control overhead in the two types of subframe.

According to certain aspects, an ending symbol for e-PDCCH using a TDM scheme as described above may be configured better manage capacity split between downlink and uplink grants. According to certain aspects, the ending symbol index may be configured to within a certain limit (i.e. upper bound) to consider needs for early decoding of the downlink transmission.

According to certain aspects, starting symbols for downlink data channel (i.e. PDSCH) that are scheduled by e-PDCCH may be determined by a UE using a variety of techniques. It is noted that the variety of approaches described may also be used to determine a starting symbol for e-PDCCH itself within a subframe.

In a first approach, PDSCH scheduled via e-PDCCH may have a starting symbol that is derived based on detection of PCFICH. For example, if a UE can decode PCFICH in a given downlink transmission, then the UE may determine that the PDSCH scheduled via e-PDCCH may start immediately after the PCFICH region. Similarly, if the UE can decode PCFICH in a subframe having resource allocated for e-PDCCH, then the UE may determine that e-PDCCH may start in the one or more symbols immediately after the PCFICH region.

In scenarios where there is no PCFICH, such as in some new carrier types, then the starting symbol may be based from symbol 0. This approach may be utilized in such example scenarios as downlink MIMO and CoMP.

In a second approach, the starting symbol in a subframe for PDSCH scheduled via e-PDCCH may be configured via RRC signaling. Similar RRC configuration techniques may be utilized in cross-carrier scheduled PDSCH in carrier aggregation.

In a third approach, the starting symbol in a subframe for PDSCH scheduled via e-PDCCH may be dynamically indicated using control information. For example, the starting symbol may be dynamically determined based on a payload in PDCCH or as part of an e-PDCCH grant. It is noted that the dynamic approach herein described provides full flexible resource utilization.

According to certain aspects, the starting symbol in a subframe for PDSCH scheduled via e-PDCCH may be determined based on (e.g., interact with) the starting symbol index for e-PDCCH. In one aspect, the starting symbol index for e-PDCCH may serve as an upper bound for the starting symbol for PDSCH. For example, if the starting symbol index for e-PDCCH is 0, then the PDSCH may always start from an index of 0. In another example, if the starting symbol index for e-PDCCH is 1, then the starting symbol index for PDSCH can be 0 or 1; and if e-PDCCH starts on an index of 2, then PDSCH can be 0, 1, or, 2, and so forth. It is noted that the starting symbol for e-PDCCH typically has less time variance than PDSCH (which may be dynamically indicated, as described above) because the starting symbol for e-PDCCH is generally semi statically configured, as also described above. As such, in some sense e-PDCCH may be viewed as having a starting symbol later than start symbol of PDSCH. According to certain aspects, it is contemplated that the starting symbol index for e-PDCCH may be smaller than that of PDSCH, such that some early symbols in a subframe can be used as null symbols for PDSCH (e.g., interference estimation).

According to certain aspects, a UE may be configured via RRC to operate with one of two or more modes for determining a starting symbol for PDSCH scheduled by e-PDCCH or for e-PDCCH itself. In one aspect, a UE may be configured to determine the starting symbol solely utilizing the first approach based on a received PCFICH. In another aspect, a UE may be configured to first attempt to determine the starting symbol using the first approach (based on detected PCFICH), and is further configured to, should the UE be unable to process PCFICH, utilize the second approach based on RRC signaling or the third approach based on dynamic indications, as described above.

Figure 9:
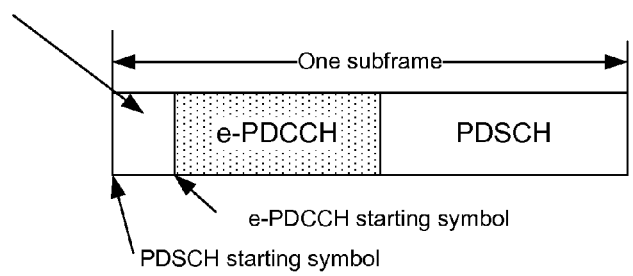
FIG. 9 illustrates another subframe configuration for a downlink control channel according to certain aspects of the disclosure.

FIG. 9 illustrates a particular scenario for determining a starting symbol index for PDSCH scheduled by e-PDCCH or for e-PDCCH itself. While FIG. 9 illustrates a TDM scheme, it is understood that certain aspects described herein may be extended to the other e-PDCCH schemes (such as FDM), as described above. In this scenario, assuming the starting symbol of e-PDCCH is denoted as "x" and the starting symbol of the corresponding PDSCH is denoted as "y", where x>y. If the e-PDCCH and the assigned PDSCH overlap within the subframe, it has been considered whether the symbols {y, y+1, . . . x−1} in the PRBs occupied by e-PDCCH may be utilized for PDSCH.

In one particular example, if e-PDCCH starts at the 4th symbol of a subframe and if PDSCH has an earlier starting symbol at index 0, as shown in FIG. 9, then PDSCH may be scheduled such that there is an overlap with the resources allocated for e-DPCCH. In the example shown, the PDSCH is also scheduled for transmission in the second slot after the e-PDCCH. As such, it has been contemplated to utilize the symbols starting earlier than the e-PDCCH at the 4th symbol to prevent those resources that may otherwise be unutilized from being wasted.

Figure 10:
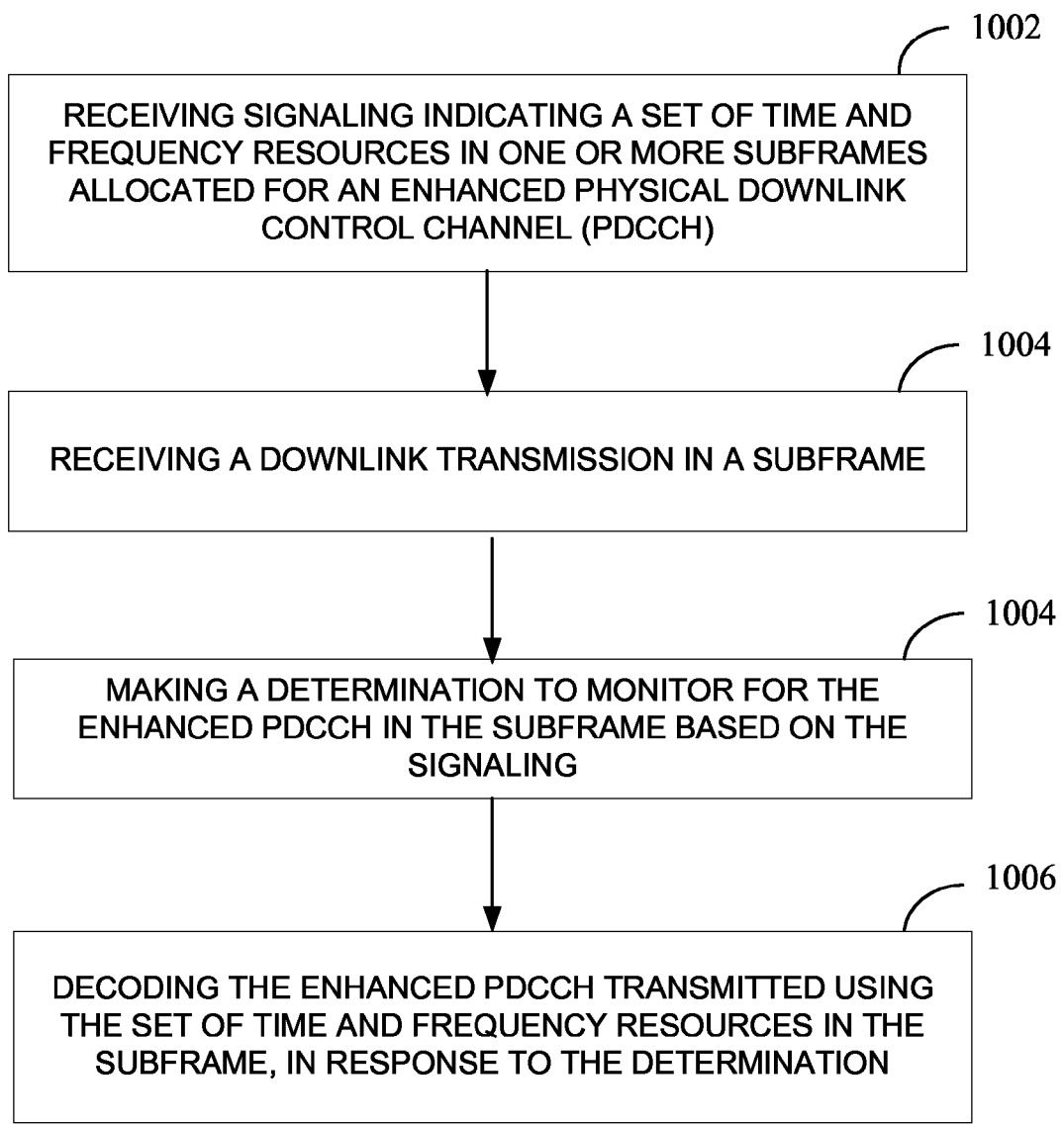
FIG. 10 is a block diagram illustrating example operations that may be performed by a user equipment for determining allocated resources for a downlink control channel, according to certain aspects of the disclosure.

FIG. 10 is a block diagram illustrating example operations 1000 for determining allocated resources for a downlink control channel that may be performed by a UE, according to certain aspects of the disclosure. The operations 1000 may be performed, for example, by the controller/processor 680 of the UE 120 shown in FIG. 3.

The operations 1000 begin, at 1002, with the UE receiving signaling indicating a set of time and frequency resources in one or more subframes allocated for an enhanced physical downlink control channel (PDCCH). At 1004, the UE receives a downlink transmission in a subframe. At 1006, the UE makes a determination to monitor for the enhanced PDCCH in the subframe based on the signaling and, at 1008, the UE decodes the enhanced PDCCH transmitted using the set of time and frequency resources in the subframe, in response to the determination.

Figure 11:
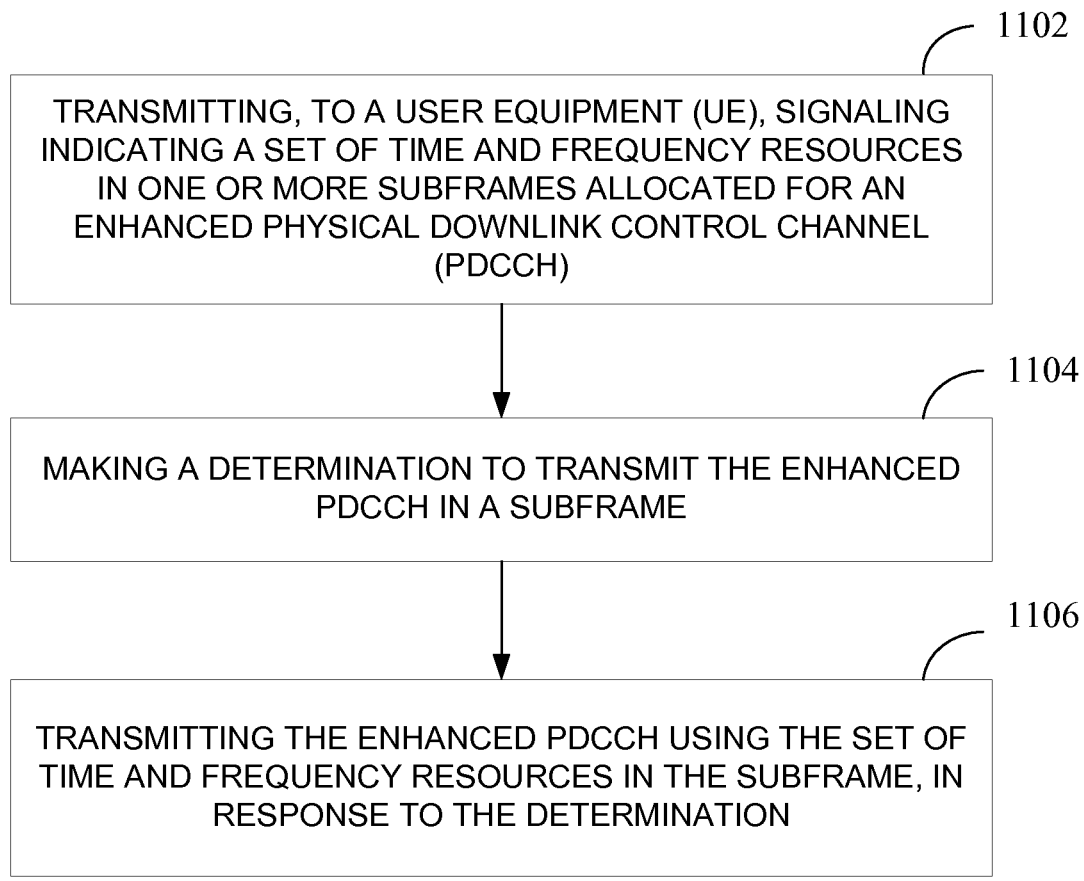
FIG. 11 is a block diagram illustrating example operations that may be performed by a base station for determining allocated resources for a downlink control channel, according to certain aspects of the disclosure.

FIG. 11 is a block diagram illustrating example operations 1100 for determining allocated resources for a downlink control channel that may be performed by a base station, according to certain aspects of the disclosure. The operations 1100 may be performed, for example, by the controller/processor 640 of the access terminal 110 (or base station) shown in FIG. 3.

The operations 1100 begin, at 1102, with the base station transmitting, to a user equipment (UE), signaling indicating a set of time and frequency resources in one or more subframes allocated for an enhanced physical downlink control channel (PDCCH). At 1104, the base station makes a determination to transmit the enhanced PDCCH in a subframe and, at 1106, the base station transmits the enhanced PDCCH using the set of time and frequency resources in the subframe, in response to the determination.

According to certain aspects, the UE may receive a message providing a configuration indicating a subset of subframes to monitor for the enhanced PDCCH.

In one aspect, the set of resources have a localized resource allocation wherein resources allocated for the enhanced PDCCH in a first half of the subframe are paired with resources in the second half of the subframe allocated for the enhanced PDCCH. In another aspect, the set of resources have a distributed resource allocation wherein the set of resources are allocated in non-consecutive resource blocks. In one aspect, the set of resources allocated for the enhanced PDCCH are arranged in units comprising physical resource block (PRB) pairs. The set of resources allocated for the enhanced PDCCH may further be arranged in a fraction of a physical resource block (PRB) pair. In one aspect, the resources allocated for the enhanced PDCCH are separately configured for each aggregation level. Further, the set of resources allocated for the enhanced PDCCH may be separately configured for uplink grants and downlink grants.

According to certain aspects, responsive to detecting a control format indicator channel, the UE may determine a starting symbol of the set of resources for the enhanced PDCCH in a subframe based on the control format indicator channel. Responsive to not detecting a control format indicator channel, the UE may determine a starting symbol of the set of resources for the enhanced PDCCH based on a radio resource control (RRC) configuration.

According to certain aspects, the UE may determine a starting symbol for the downlink data channel by utilizing a starting symbol index of the enhanced PDCCH as an upper bound. In one aspect, the UE may determine a starting symbol of the enhanced PDCCH is later than a starting symbol for a PDSCH. Further, the UE may determine a subset of symbols prior to the enhanced PDCCH as being allocated to the PDSCH.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications by a user equipment (UE), comprising:
   receiving signaling indicating a set of time and frequency resources in one or more subframes allocated for an enhanced physical downlink control channel (PDCCH);
   receiving a downlink transmission in a subframe;
   making a determination to monitor for the enhanced PDCCH in the subframe based on the signaling; and
   decoding the enhanced PDCCH transmitted using the set of time and frequency resources in the subframe, in response to the determination.

2. The method of claim 1, wherein the set of resources spans a region also used for a physical downlink shared channel (PDSCH).

3. The method of claim 1, wherein the set of resources have a localized resource allocation wherein resources allocated for the enhanced PDCCH in a first half of the subframe are paired with resources in the second half of the subframe allocated for the enhanced PDCCH.

4. The method of claim 1, wherein the set of resources have a distributed resource allocation wherein the set of resources are allocated in non-consecutive resource blocks.

5. The method of claim 1, wherein the set of resources allocated for the enhanced PDCCH are arranged in units comprising physical resource block (PRB) pairs.

6. The method of claim 1, wherein at least two sets of resources are configured for the enhanced PDCCH.

7. The method of claim 1, further comprising:
   receiving a message providing a configuration indicating a subset of subframes to monitor for the enhanced PDCCH.

8. The method of claim 7, wherein the message is one of a unicast message and a broadcast message, and the configuration indicates the subset of subframes via a bitmap.

9. The method of claim 1, further comprising monitoring a legacy PDCCH in a subframe if a determination is made to not monitor the enhanced PDCCH in the subframe.

10. The method of claim 1, comprising making a determination to monitor the enhanced PDCCH in all subframes.

11. The method of claim 1, wherein monitoring of the enhanced PDCCH in the subframe comprises monitoring a search space specific to the UE.

12. The method of claim 1, further comprising:
responsive to detecting a control format indicator channel, determining a starting symbol of the set of resources for the enhanced PDCCH in a subframe based on the control format indicator channel.

13. The method of claim 1, further comprising:
responsive to not detecting a control format indicator channel, determining a starting symbol of the set of resources for the enhanced PDCCH based on a radio resource control (RRC) configuration.

14. The method of claim 13, further comprising determining a first starting symbol in a first subframe, and determining a second starting symbol, different from the first starting symbol, in a second subframe.

15. The method of claim 14, wherein the first subframe is a multimedia broadcast single frequency network (MBSFN) subframe and the second subframe is a non-MBSFN subframe.

16. The method of claim 1, further comprising:
determining a first starting symbol of the set of resources for the enhanced PDCCH for unicast in a subframe, and determining a second starting symbol, different from the first starting symbol, of a set of resources for the enhanced PDCCH for broadcast or multicast in the same subframe.

17. The method of claim 1, further comprising:
determining a starting symbol for a physical downlink data shared channel (PDSCH) by utilizing a starting symbol index of the enhanced PDCCH.

18. The method of claim 1, further comprising:
dynamically determining a starting symbol for a physical downlink data shared channel (PDSCH) scheduled by the enhanced PDCCH based on an indication in the enhanced PDCCH.

19. A method for wireless communications by a base station, said method comprising:
transmitting, to a user equipment (UE), signaling indicating a set of time and frequency resources in one or more subframes allocated for an enhanced physical downlink control channel (PDCCH);
making a determination to transmit the enhanced PDCCH in a subframe; and
transmitting the enhanced PDCCH using the set of time and frequency resources in the subframe, in response to the determination.

20. The method of claim 19, wherein the set of resources spans a region also used for a physical downlink shared channel (PDSCH).

21. The method of claim 19, wherein the set of resources have a localized resource allocation wherein resources allocated for the enhanced PDCCH in a first half of the subframe are paired with resources in the second half of the subframe allocated for the enhanced PDCCH.

22. The method of claim 19, wherein the set of resources have a distributed resource allocation wherein the set of resources are allocated in non-consecutive resource blocks.

23. The method of claim 19, wherein the set of resources allocated for the enhanced PDCCH are arranged in units comprising physical resource block (PRB) pairs.

24. The method of claim 19, wherein at least two sets of resources are configured for the enhanced PDCCH.

25. The method of claim 19, further comprising:
transmitting a message providing a configuration indicating a subset of subframes to monitor for the enhanced PDCCH.

26. The method of claim 25, wherein the message is one of a unicast message and a broadcast message, and the configuration indicates the subset of subframes via a bitmap.

27. The method of claim 19, further comprising transmitting a legacy PDCCH in the subframe if a determination is made to not transmit the enhanced PDCCH in the subframe.

28. The method of claim 19, wherein the base station is allowed to make a determination to transmit an enhanced PDCCH in all subframes.

29. The method of claim 19, wherein transmitting the enhanced PDCCH in the subframe comprises transmitting the enhanced PDCCH in a search space specific to the UE.

30. The method of claim 19, further comprising:
determining a starting symbol of the set of resources for the enhanced PDCCH in a subframe based on a control format indicator channel.

31. The method of claim 19, further comprising:
transmitting, via radio resource control (RRC) signaling, a configuration indicating a starting symbol of the set of resources for the enhanced PDCCH.

32. The method of claim 31, further comprising determining a first starting symbol in a first subframe, and determining a second starting symbol, different from the first starting symbol, in a second subframe.

33. The method of claim 32, wherein the first subframe is a multimedia broadcast single frequency network (MBSFN) subframe and the second subframe is a non-MBSFN subframe.

34. The method of claim 19, further comprising:
determining a first starting symbol of the set of resources for the enhanced PDCCH for unicast in a subframe, and determining a second starting symbol, different from the first starting symbol, of a set of resources for the enhanced PDCCH for broadcast or multicast in the same subframe.

35. The method of claim 19, further comprising:
determining a starting symbol for a physical downlink data shared channel (PDSCH) by utilizing a starting symbol index of the enhanced PDCCH.

36. The method of claim 19, further comprising:
dynamically indicating a starting symbol for a physical downlink data shared channel (PDSCH) scheduled by the enhanced PDCCH by providing an indication in the enhanced PDCCH.

37. An apparatus for wireless communications by a user equipment (UE), comprising:
means for receiving signaling indicating a set of time and frequency resources in one or more subframes allocated for an enhanced physical downlink control channel (PDCCH);
means for receiving a downlink transmission in a subframe;
means for making a determination to monitor for the enhanced PDCCH in the subframe based on the signaling; and
means for decoding the enhanced PDCCH transmitted using the set of time and frequency resources in the subframe, in response to the determination.

38. The apparatus of claim 37, wherein the set of resources spans a region also used for a physical downlink shared channel (PDSCH).

39. The apparatus of claim 37, wherein the set of resources have a localized resource allocation wherein resources allocated for the enhanced PDCCH in a first half of the subframe are paired with resources in the second half of the subframe allocated for the enhanced PDCCH.

40. The apparatus of claim 37, wherein the set of resources have a distributed resource allocation wherein the set of resources are allocated in non-consecutive resource blocks.

41. The apparatus of claim 37, wherein the set of resources allocated for the enhanced PDCCH are arranged in units comprising physical resource block (PRB) pairs.

42. The apparatus of claim 37, wherein at least two sets of resources are configured for the enhanced PDCCH.

43. The apparatus of claim 37, further comprising:
means for receiving a message providing a configuration indicating a subset of subframes to monitor for the enhanced PDCCH.

44. The apparatus of claim 43, wherein the message is one of a unicast message and a broadcast message, and the configuration indicates the subset of subframes via a bitmap.

45. The apparatus of claim 37, further comprising means for monitoring a legacy PDCCH in a subframe if a determination is made to not monitor the enhanced PDCCH in the subframe.

46. The apparatus of claim 37, comprising means for making a determination to monitor the enhanced PDCCH in all subframes.

47. The apparatus of claim 37, wherein the means for monitoring of the enhanced PDCCH in the subframe comprises means for monitoring a search space specific to the UE.

48. The apparatus of claim 37, further comprising:
means for determining, responsive to detecting a control format indicator channel, a starting symbol of the set of resources for the enhanced PDCCH in a subframe based on the control format indicator channel.

49. The apparatus of claim 37, further comprising:
means for determining, responsive to not detecting a control format indicator channel, a starting symbol of the set of resources for the enhanced PDCCH based on a radio resource control (RRC) configuration.

50. The apparatus of claim 49, further comprising means for determining a first starting symbol in a first subframe, and means for determining a second starting symbol, different from the first starting symbol, in a second subframe.

51. The apparatus of claim 50, wherein the first subframe is a multimedia broadcast single frequency network (MBSFN) subframe and the second subframe is a non-MBSFN subframe.

52. The apparatus of claim 37, further comprising:
means for determining a first starting symbol of the set of resources for the enhanced PDCCH for unicast in a subframe, and means for determining a second starting symbol, different from the first starting symbol, of a set of resources for the enhanced PDCCH for broadcast or multicast in the same subframe.

53. The apparatus of claim 37, further comprising:
means for determining a starting symbol for a physical downlink data shared channel (PDSCH) by utilizing a starting symbol index of the enhanced PDCCH.

54. The apparatus of claim 37, further comprising:
means for dynamically determining a starting symbol for a physical downlink data shared channel (PDSCH) scheduled by the enhanced PDCCH based on an indication in the enhanced PDCCH.

55. An apparatus for wireless communications by a base station, said apparatus comprising:
means for transmitting, to a user equipment (UE), signaling indicating a set of time and frequency resources in one or more subframes allocated for an enhanced physical downlink control channel (PDCCH);
means for making a determination to transmit the enhanced PDCCH in a subframe; and
means for transmitting the enhanced PDCCH using the set of time and frequency resources in the subframe, in response to the determination.

56. The apparatus of claim 55, wherein the set of resources spans a region also used for a physical downlink shared channel (PDSCH).

57. The apparatus of claim 55, wherein the set of resources have a localized resource allocation wherein resources allocated for the enhanced PDCCH in a first half of the subframe are paired with resources in the second half of the subframe allocated for the enhanced PDCCH.

58. The apparatus of claim 55, wherein the set of resources have a distributed resource allocation wherein the set of resources are allocated in non-consecutive resource blocks.

59. The apparatus of claim 55, wherein the set of resources allocated for the enhanced PDCCH are arranged in units comprising physical resource block (PRB) pairs.

60. The apparatus of claim 55, wherein at least two sets of resources are configured for the enhanced PDCCH.

61. The apparatus of claim 55, further comprising:
means for transmitting a message providing a configuration indicating a subset of subframes to monitor for the enhanced PDCCH.

62. The apparatus of claim 61, wherein the message is one of a unicast message and a broadcast message, and the configuration indicates the subset of subframes via a bitmap.

63. The apparatus of claim 55, further comprising means for transmitting a legacy PDCCH in the subframe if a determination is made to not transmit the enhanced PDCCH in the subframe.

64. The apparatus of claim 55, wherein the base station is allowed to make a determination to transmit an enhanced PDCCH in all subframes.

65. The apparatus of claim 55, wherein means for transmitting the enhanced PDCCH in the subframe comprises transmitting the enhanced PDCCH in a search space specific to the UE.

66. The apparatus of claim 55, further comprising:
means for determining a starting symbol of the set of resources for the enhanced PDCCH in a subframe based on a control format indicator channel.

67. The apparatus of claim 55, further comprising:
means for transmitting, via radio resource control (RRC) signaling, a configuration indicating a starting symbol of the set of resources for the enhanced PDCCH.

68. The apparatus of claim 67, further comprising means for determining a first starting symbol in a first subframe, and determining a second starting symbol, different from the first starting symbol, in a second subframe.

69. The apparatus of claim 68, wherein the first subframe is a multimedia broadcast single frequency network (MBSFN) subframe and the second subframe is a non-MBSFN subframe.

70. The apparatus of claim 55, further comprising:
means for determining a first starting symbol of the set of resources for the enhanced PDCCH for unicast in a subframe, and means for determining a second starting symbol, different from the first starting symbol, of a set of resources for the enhanced PDCCH for broadcast or multicast in the same subframe.

71. The apparatus of claim 55, further comprising:
means for determining a starting symbol for a physical downlink data shared channel (PDSCH) by utilizing a starting symbol index of the enhanced PDCCH.

72. The apparatus of claim 55, further comprising:
means for dynamically indicating a starting symbol for a physical downlink data shared channel (PDSCH) scheduled by the enhanced PDCCH by providing an indication in the enhanced PDCCH.

73. An apparatus for wireless communications by a user equipment (UE), comprising:
at least one processor configured to receive signaling indicating a set of time and frequency resources in one or more subframes allocated for an enhanced physical downlink control channel (PDCCH), receive a downlink transmission in a subframe, make a determination to monitor for the enhanced PDCCH in the subframe based on the signaling, and decode the enhanced PDCCH transmitted using the set of time and frequency resources in the subframe, in response to the determination; and
a memory coupled with the at least one processor.

74. An apparatus for wireless communications by a base station, said apparatus comprising:
at least one processor configured to transmit, to a user equipment (UE), signaling indicating a set of time and frequency resources in one or more subframes allocated for an enhanced physical downlink control channel (PDCCH), make a determination to transmit the enhanced PDCCH in a subframe, and transmit the enhanced PDCCH using the set of time and frequency resources in the subframe, in response to the determination; and
a memory coupled with the at least one processor.

75. A computer program product for wireless communications by a user equipment (UE) comprising a non-transitory computer readable medium having instructions stored thereon, the instructions executable by one or more processors for:
receiving signaling indicating a set of time and frequency resources in one or more subframes allocated for an enhanced physical downlink control channel (PDCCH);
receiving a downlink transmission in a subframe;
making a determination to monitor for the enhanced PDCCH in the subframe based on the signaling; and
decoding the enhanced PDCCH transmitted using the set of time and frequency resources in the subframe, in response to the determination.

76. A computer program product for wireless communications by a base station comprising a non-transitory computer readable medium having instructions stored thereon, the instructions executable by one or more processors for:
transmitting, to a user equipment (UE), signaling indicating a set of time and frequency resources in one or more subframes allocated for an enhanced physical downlink control channel (PDCCH);
making a determination to transmit the enhanced PDCCH in a subframe; and
transmitting the enhanced PDCCH using the set of time and frequency resources in the subframe, in response to the determination.

* * * * *